United States Patent

Kaneda et al.

[11] Patent Number: 5,868,336
[45] Date of Patent: Feb. 9, 1999

[54] TAPE GUIDES FOR TAPE CASSETTE

[75] Inventors: Hiroshi Kaneda, Asashina-mura; Masatoshi Okamura, Saku; Hiroshi Yasuda, Mobara; Yukihiro Tsuchiya, Fujimi, all of Japan

[73] Assignee: TDK Corporation, Tokyo, Japan

[21] Appl. No.: 992,001

[22] Filed: Dec. 17, 1997

[30] Foreign Application Priority Data

Jan. 9, 1997 [JP] Japan .................................. 9-013298

[51] Int. Cl.$^6$ .................................................. G11B 15/60
[52] U.S. Cl. .................... 242/346; 242/615.4; 226/196.1
[58] Field of Search ..................... 242/346, 615, 242/615.4; 360/90.6, 130.21; 226/196.1

[56] References Cited

U.S. PATENT DOCUMENTS

| | | | |
|---|---|---|---|
| 4,085,907 | 4/1978 | Suzuki et al. ......................... | 242/345.2 |
| 4,276,575 | 6/1981 | Schoettle et al. .................... | 360/130.21 |
| 4,341,365 | 7/1982 | Oishi .................................... | 242/338.3 |
| 4,434,202 | 2/1984 | Uedaira et al. ........................ | 428/143 |
| 4,596,847 | 6/1986 | Kasuga et al. ......................... | 524/220 |
| 4,621,779 | 11/1986 | Fitterer et al. ...................... | 242/343.2 |
| 4,635,877 | 1/1987 | Oishi et al. ........................... | 242/346 |
| 4,638,387 | 1/1987 | Mukasa et al. ..................... | 360/130.21 |
| 5,234,994 | 8/1993 | Shiraki et al. ........................ | 525/92 D |
| 5,276,080 | 1/1994 | Oku ....................................... | 524/432 |
| 5,373,046 | 12/1994 | Okamura et al. ....................... | 524/413 |
| 5,417,379 | 5/1995 | Gelardi et al. ......................... | 242/347 |
| 5,422,061 | 6/1995 | Takahashi et al. ..................... | 264/571 |

*Primary Examiner*—John P. Darling
*Attorney, Agent, or Firm*—Sprung Kramer Schaefer & Briscoe

[57] ABSTRACT

Tape guides for guiding a magnetic tape in a tape cassette including a two-half cassette housing one half of which holds a pair of tape reels and a length of magnetic tape wound on the reels, said housing half having openings formed on the front side for supply and takeup of the tape, said tape guides being located at both corners of the front side and adjacent the openings, are made basically of a composite resin material of polyethylene and polypropylene resins and contain a carbon black and an anisotropic inorganic filler.

4 Claims, 2 Drawing Sheets

TAPE GUIDES FOR TAPE CASSETTE

BACKGROUND OF THE INVENTION

This invention relates to tape guides for use, in a pair, in a magnetic tape cassette.

Conventional magnetic tape cassettes use a pair of tape guides to guide the tape in its travel. For example, FIG. 1 shows, as exploded, a video tape cassette of the VHS format. The cassette comprises an upper housing half a, a front lid b pivotally connected to the both ends of the front side of the upper housing half, a pair of reels c on which a length of magnetic tape is wound, and a lower housing half d, with a pair of tape guides e located at both corners of the front side of the lower housing half d. When the magnetic tape is played back, it runs in sliding contact with the tape guides e. To ensure smooth running of the tape, the tape guides must be of a material having sufficiently high surface precision, dimensional stability, low rate of abrasion, and high slipperiness. Heretofore most tape guides have been made from metals such as SUS grade stainless steels and hard chromium-plated brass that can meet these qualitative requirements.

However, the metallic tape guides have the disadvantages of low productivity and high cost because their manufacture involves many steps including stock forming, grinding, plating, finish polishing, and inspection.

It has been proposed to replace metals for tape guides by acetal plastic (POM) or ultra-high-molecular-weight polyolefin, with or without lubricant, wear-resistant pigment, etc. The use of these substitutes has, however, been limited because of their high material prices and rather inadequate properties. For example, Japanese Patent Application Kokai No. 1-292045 teaches fabrication from an ultra-high-molecular-weight polyethylene or polypropylene having a molecular weight of half a million to one million or their copolymer in which an anisotropic inorganic substance, e.g., inorganic particles in the form of whiskers or rods such as glass fiber, or planar inorganic particles, e.g., of graphite or molybdenum disulfide, is dispersed. However, POM has low wear and other properties yet to be improved and is, moreover, too expensive. Ultra-high-molecular-weight polyolefins have desirable properties but have shortcomings of poor moldability and costliness.

Other problems common to the guide members made from the polyacetal and ultra-high-molecular-weight resins are adsorption of ambient dirt and dust or tape sticking by dint of static charge caused by friction.

As stated above, the manufacture of metallic tape guides that involves many steps such as stock forming, grinding, plating, finish polishing, and inspection have the disadvantages of low productivity and high cost. POM and ultra-high-molecular-weight polyolefins are inferior in abrasion wear and moldability and, moreover, are costly.

The present invention is aimed at providing tape guides for tape cassettes which eliminate the disadvantages of the prior art and exhibit performance as tape guides comparable to those of metals, the guides being able to be made from low cost material, with good moldability, and at low manufacturing cost.

SUMMARY OF THE INVENTION

In a tape cassette including a two-half cassette housing one half of which holds a pair of tape reels and a length of magnetic tape wound on the reels, said housing half having openings formed on the front side for supply and takeup of the tape, a pair of tape guides located at both corners of the front side and adjacent the openings are characterized in that they are made basically of a composite resin material of polyethylene and polypropylene resins and contain a carbon black and an anisotropic inorganic filler.

DETAILED DESCRIPTION OF THE INVENTION

Figure 1:
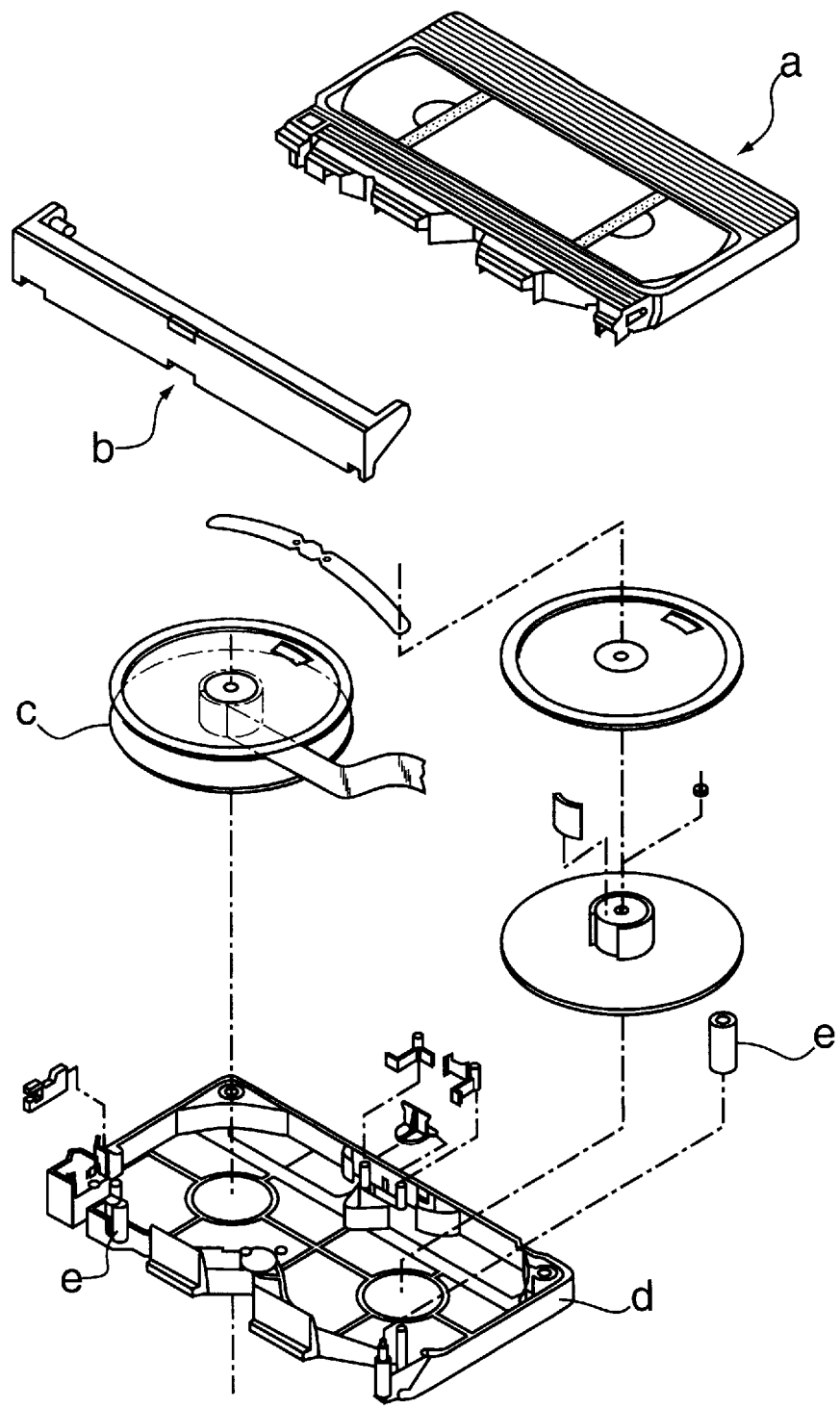
FIG. 1 is an exploded view of an ordinary videotape cassette of the VHS format.

The products of the invention desirably use from 60 to 90 percent by weight of a composite resin material of polyethylene and polypropylene resins, from 5 to 15 percent by weight of a carbon black, and from 5 to 35 percent by weight of an anisotropic inorganic filler.

If the proportion of the polyolefinic resin composite material (PE+PP) is less than 60 percent by weight, the resulting tape guides have low surface smoothness and increase the wear of themselves and the tape that comes in contact. A proportion greater than 90 percent by weight is undesirable either because of accelerated wear of the guides themselves.

The proportion of the polyethylene resin to the polypropylene resin in the composite resin material desirably is from 60 to 90 percent by weight to from 40 to 10 percent by weight. This proportional range allows the material to have such good fluidity that its moldability becomes excellent and its mechanical properties favorable. When the proportion of the polypropylene resin is less than 10 percent by weight, a tendency toward higher coefficient of friction is noted. A polypropylene resin proportion of over 40 percent by weight tends to cause an increase in the friction coefficient and decreases in mechanical (tensile) strength and impact resistance.

If the proportion of the anisotropic inorganic filler is less than 5 percent by weight, the resulting tape guides attain an increased coefficient of friction and decreased surface hardness (and becomes soft). This is undesirable because the guides wear faster than usual. Also, more than 35 percent by weight of the inorganic filler hardens the surface and aggravates the surface properties, thus accelerating the wear of the tape.

On the other hand, the addition of from 10 to 35 percent by weight of a non-anisotropic, globular inorganic filler is unadvisable in that it increases the friction coefficient and promotes the wear of the tape guides and tape alike.

A carbon black proportion of less than 5 percent by weight is not recommended because the material tends to generate static electricity. If the proportion exceeds 15 percent by weight, the results are again unfavorable, with increased friction coefficient and wear of both tape guides and tape.

The polyethylene resins that can be used for the present invention are, e.g., high-, medium-, and low-density polyethylenes, linear polyethylenes, ethylene-vinyl acetate copolymers, and ethylene-ethyl acrylate copolymers. The list does not contain the resins having a melt flow rate below 4 g/10 min, such as ultra-high-molecular-weight polyethylenes, because they deteriorate the molding properties of the composite material and to the cost.

Among useful polypropylene resins are atactic, syndiotactic, and isotactic polypropylenes, propylene-ethylene block copolymers, and propylene-ethylene random copolymers. The resins having a melt flow rate below 5 g/10 min, such as ultra-high-molecular-weight polypropylenes, are not included in the list because they deteriorate the molding properties of the composite material and raises the cost.

The present invention uses a mixed resin consisting of a polypropylene resin and a polyethylene resin, since neither alone can impart adequate properties. Particularly desirable is a mixed resin consisting of a polypropylene (propylene homopolymer) having a melt flow rate (hereinafter called "MFR" for brevity) of from 5 to 30 g/10 min as measured at 230° C. under a load of 2.16 kg and a polyethylene (ethylene homopolymer) having a specific gravity of from 0.954 to 0.970 and an MFR of from 4 to 25 g/10 min as measured at 190° C. under a load of 2.16 kg.

A polypropylene with an MFR of less than 5 g/10 min has a tendency of increasing the coefficient of friction (friction resistance) of the resulting tape guides. A polypropylene with an MFR of greater than 30 g/10 min tends to lessen the impact resistance.

If the specific gravity of the polyethylene is below 0.954, the friction coefficient tends to increase, whereas a polyethylene with a specific gravity of more than 0.970 tends to reduce the impact resistance.

If the MFR of the polyethylene is less than 4 g/10 min, the friction coefficient tends to increase, and if the MFR is more than 25 g/10 min the mechanical strength tends to decrease.

The anisotropic inorganic filler for use in the present invention is chosen from among inorganic fillers having the shape of plates, flakes, fibers, needles, columns and the like.

To be more concrete, the fillers include, but are not limited to, talc, mica, graphite, and clay among the plate and flaky types; potassium titanate whiskers, fibrous magnesium oxysulfate, and zinc oxide whiskers among the fibrous and needle types; and wollastonite among the column type.

The anisotropic inorganic filler for use in the invention is preferably one or more selected from the group consisting of the above-mentioned talc, mica, graphite, clay potassium titanate whiskers, fibrous magnesium oxysulfate, zinc oxide whiskers, and wollastonite.

The use of an inorganic filler that is not anisotropic, e.g., a globular, amorphous, or square-shaped inorganic filler, is undesirable because it sharply increases the coefficient of friction and accelerates the wear of both tape guides and tape. Typical examples of non-anisotropic inorganic fillers are (ground Whiting) calcium carbonate and (precipitated) barium sulfate. The (ground Whiting) calcium carbonate is finely ground natural limestone in an amorphous form. The (precipitated) barium sulfate, formed by precipitation in the liquid phase, takes a globular form.

The size of the anisotropic inorganic filler is not specially limited provided it can be used as an ordinary filler. The average particle diameter ranges of the commonly used fillers are: in the case of talc (plates), 5–15 $\mu$m; wollastonite (needles), 2–8 $\mu$m; inorganic whisker (fibrous), 0.1–5 $\mu$m; mica (plates), 10–30 $\mu$m; and graphite (plates), 10–30 $\mu$m. The larger the particle diameter or the fiber diameter the greater the friction coefficient or the lower the smoothness tends to become. In the case of mica or graphite, a large diameter causes a drop in impact resistance.

When talc is used as an anisotropic inorganic filler, one having an average particle diameter of 20 $\mu$m or less is desirable. As noted above, one having an average particle diameter range of 5–15 $\mu$m is particularly desirable. When the average particle size is beyond 20 $\mu$m, the filler is undesirable because it reduces the impact resistance and mechanical strength and increases the wear of the tape guides and tape.

In the practice of the present invention two or more such anisotropic inorganic fillers may be used in combination, when necessary.

The carbon black to be used in the invention may be a commercially available one such as furnace black, thermal black, or acetylene black. Especially desirable is one having a specific surface area in excess of 700 $m^2$/g and a dibutyl phthalate oil absorption of more than 300 ml/mg. When the specific surface-area is less than 700 $m^2$/g or the DBP oil absorption is less than 300 ml/mg, a wear-increasing tendency is observed.

The resin material composition for use in the invention is made up of three components, i.e., a mixture of a polyethylene resin and a polypropylene resin, an anisotropic inorganic filler for enhancing wear resistance, and a carbon black as an antistatic. The composition may contain an antioxidant to avoid the deterioration of the resin material or/and a lubricant to improve the filling properties. Among other useful additives are paraffins, palmitic acid, ester compounds, thiophene compounds, and stearic acid.

The invention is illustrated by the following examples.

Composite resin materials were prepared by melting and mixing below-mentioned components in varied proportions by means of a twin-screw kneader (manufactured by Ikegai Corp., model "PCM4511") at a barrel temperature of 190°–220° C. and pelletizing the mixture by strand cutting.

From the composite resin compositions thus formed, test pieces were made using an injection molding machine (manufactured by Nissei Jushi Kogyo, model "FS-150S") at a cylinder temperature of 190°–210° C. and die temperature of 40° C. The pieces were tested for their friction, mechanical, and antistatic properties. In the working examples these properties were determined and evaluated by the following methods:

(1) REW torque:—Each cassette equipped with test tape guides was played back on a general-purpose videotape recorder (manufactured by JVC, model "VT2100") for 20 minutes. The tape was allowed to pass 50 times along the guides with a torque of 250 g.cm and the time lags required for rewinding (REW) after the 50 runs were measured. Criteria were: o=up to 7 sec.; Δ=7–9 sec.; x=no more running.

(2) Tape running property:—Using a general-purpose VTR (manufactured by Panasonic, model "AG2695"), a sequence of quick forwarding and quick rewinding was repeated 50 times and the tape was inspected for dusting. Criteria: o=no dusting; Δ=trace (no effect upon dropout); x=much dusting.

(3) Tape scratching:—A sequence of quick tape forwarding and rewinding was repeated 50 times on a general-purpose VTR (manufactured by Panasonic, model "AG2695") and the tape was inspected for scratching (on the side opposite to the magnetically coated side). Criteria: o=no scratching; Δ=a few to several (1–9 scratches); x=many (11 or more scratches).

(5) Moldability:—In molding operation with a molding machine manufactured by Sumitomo, model "SG75", set for a molding cycle of 20 seconds and precision of 20 $\mu$m or less, the actual molding precision or cycle was confirmed. Criteria: o=10 $\mu$m or less; Δ=11–30 $\mu$m; x=31 $\mu$m or more or a molding cycle of 21 seconds or more.

(6) Friction coefficient:—The friction coefficient of each test piece was determined by the ring-on-plate method using a Suzuki type friction wear tester (conforming to JIS K7218) under the conditions of 1 kg/cm$^2$×500 mm/min.

(7) Abrasive wear (of tape guide):—Weight losses of various test pieces after the determination of the friction coefficient with a Suzuki type friction wear tester (JIS K7218) under similar conditions were relatively evaluated. Criteria: o=minimal; Δ=rather large; x=large.

(8) Abrasive wear (of tape):—Weight losses of various pieces after the friction coefficient determination with a Suzuki type friction wear tester (JIS K7218) under similar conditions were relatively evaluated. Criteria: o=minimal; Δ=rather large; x=large.

(9) Antistatic property:—Each test piece was fixed in a dirt chamber (manufactured by Ueki Mokkosho, model "MT Dirt Chamber"), sprayed with a copying toner by a blower for 5 minutes, and was inspected for any trace of toner deposition. Criteria: o=no toner dust; Δ=partial dusting; x=dusting throughout.

EXAMPLE 1

Resins that had favorably performed in preliminary experiments were chosen and the friction properties of the mixtures in varying proportions were determined. As a polypropylene resin, a homopolymer with an MFR of 13 g/10 min was used and, as a polyethylene resin, a homopolymer with an MFR of 5 g/10 min, and their proportions were varied. Each composition was mixed with 10 percent by weight of a (platy) talc having an average particle diameter of 8 μm and 5 percent by weight of a carbon black (dibutyl phthalate oil absorption, 350 ml/100 g; specific surface area, 800 m$^2$/g) as inorganic substances. Columnar tape guides molded from those compositions gave the results shown in FIG. 2.

Figure 2:
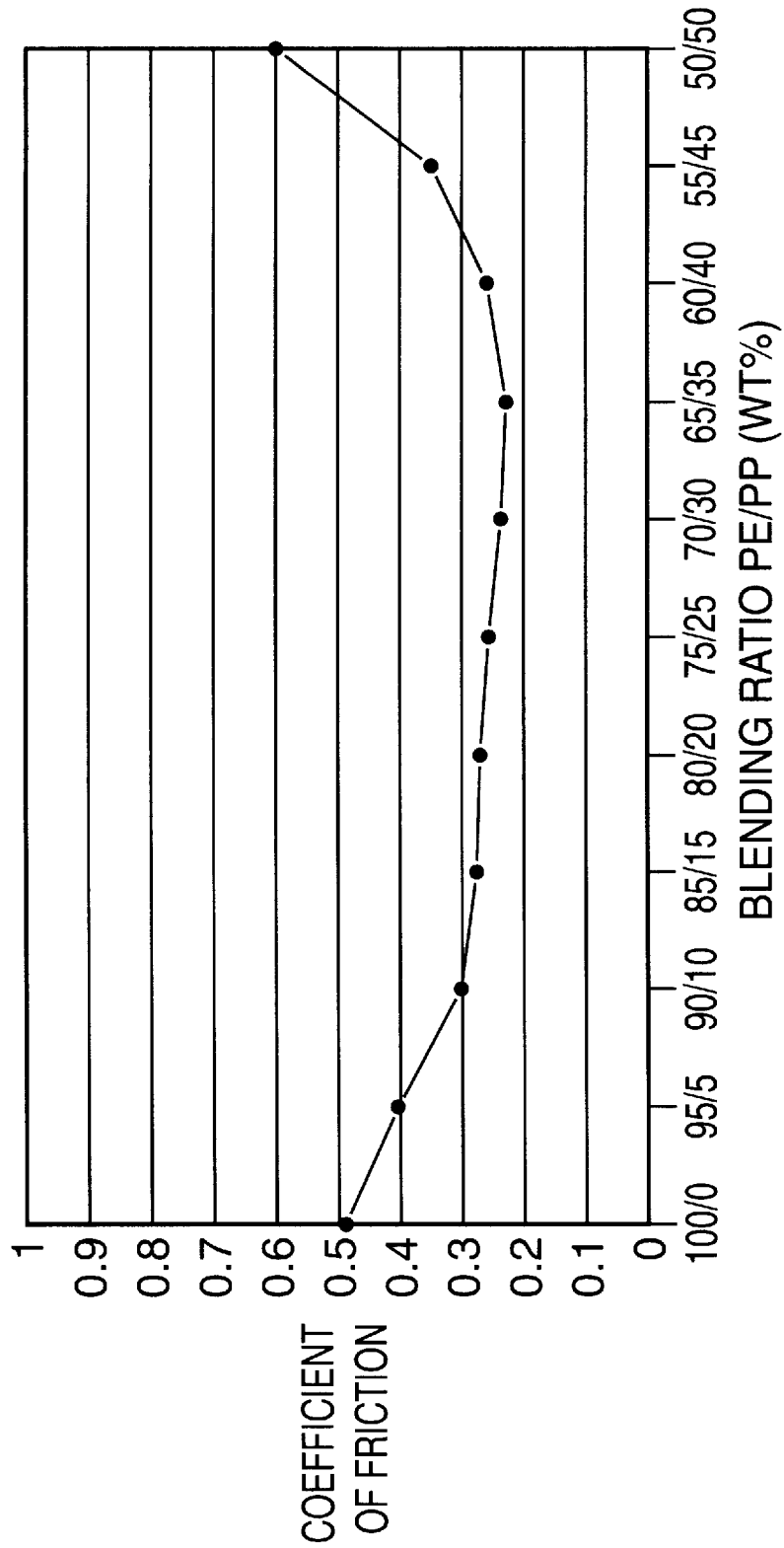
FIG. 2 is a graph showing the relationship between the polyethylene-polypropylene mixing ratio and the coefficient of friction.

FIG. 2 graphically represents the relationship between the coefficient of friction and the mixing ratio of polyethylene-polypropylene composite materials. The graph reveals that the friction is low when the polyethylene-polypropylene mixing ratio by weight is in the range from about 90:10 to about 60:40 and becomes extremely high when the ratio is outside the above range. Stable friction properties can be expected, in particular, from the range of about 85:15 to about 65:35.

EXAMPLE 2 AND COMPARATIVE EXAMPLES 1–5

A composite resin material consisting of the homopolymerized polyethylene and the homopolymerized polypropylene according to Example 1 in a mixing ratio by weight of 70:30 was used. Columnar tape guides were molded from the composite resin material with the addition of 8 percent by weight each of a (platy) talc and a carbon black (dibutyl phthalate oil absorption, 350 ml/100 g; specific surface area, 800 m$^2$/g) as anisotropic inorganic fillers.

For comparison purposes, tape guides were fabricated from the composite resin material with the addition of only the same amount of the carbon black as given above (Comparative Example 1), the composite resin material with the addition of only the same amount of the talc (Comparative Example 2), polypropylene alone (Comparative Example 3), ultra-high-molecular-weight polyethylene (Comparative Example 4), and POM (Comparative Example 5).

Table 1 compares the properties of the products as tape guides for videotape cassettes of the VHS format, moldability of the parts, and material cost. Among the comparative examples, the guides made from POM were not fully satisfactory in properties. The products of ultra-high-molecular-weight PE showed favorable properties but proved inferior in moldability (adaptability for quantity production). Both materials cost higher than the polyolefinic resin composite material (PE+PP).

In Example 2, combined use of a talc (anisotropic inorganic filler) and a carbon black modified the resins to exhibit superior properties.

TABLE 1

|  | Material | REW torque | Tape running property | Tape scratch | Guide scratch | Moldability | Cost |
|---|---|---|---|---|---|---|---|
| Example 2 | PE + PP + talc + carbon | o | o | o | o | o | low |
| Comp. Ex. 1 | PE + PP + talc | o | Δ | o | x | o | low |
| Comp. Ex. 2 | PE + PP + | x | Δ | o | o | o | low |
| Comp. Ex. 3 | PP | x | x | x | o | o | low |
| Comp. Ex. 4 | ultra-high mole. wt. PP | Δ | o | o | o | Δ | high |
| Comp. Ex. 5 | POM | Δ | Δ | x | x | o | high |

EXAMPLE 3–6 AND COMPARATIVE EXAMPLES 6–10

Test pieces were made in the same manner as described in Example 2. While the mixing ratio of the polyolefinic resin composite material (PE+PP) was kept constant at 70:30, the carbon black and anisotropic inorganic filler (talc) were contained in varied proportions, and the relationship between the material proportions and properties was found. The results are summarized in Table 2. The coefficient of friction was low in Examples 3–6, where the abrasion wear was negligible on both tape guides and tape and the antistatic property was the best. In Comparative Example 6 the excessive amount of the inorganic filler increased the friction coefficient and made the tape guides hard and brittle, with increases in wear of both the guides and tape. Conversely, the too low carbon black and inorganic filler proportions in Comparative Example 7 raised the friction coefficient and softened the tape guides, accelerating their wear. Comparative Example 8 showed reduced antistatic property due to the insufficient carbon black content. In Comparative Example 9 the excessive carbon black resulted in a higher friction coefficient and greater wear of both tape guides and tape. Comparative Example 10 used the same mixing ratio as in Example 3 but an isotropic inorganic filler (globular talc) that replaced an anisotropic one raised the friction coefficient and increased the wear of both tape guides and tape.

TABLE 3

|  | Composition (wt %) | | | | Property | | | |
| --- | --- | --- | --- | --- | --- | --- | --- | --- |
|  | PE/PP | PE + PP | Carbon | Inorganic filler | | Fric coeff | Guide wear | Tape wear | Anti-stat |
| Example 3 | 70/30 | 75 | 10 | aniso-tropic | 15 | 0.23 | o | o | o |
| Example 4 | 70/30 | 90 | 5 | aniso-tropic | 5 | 0.25 | o | o | o |
| Example 5 | 70/30 | 80 | 10 | aniso-tropic | 10 | 0.22 | o | o | o |
| Example 6 | 70/30 | 60 | 10 | aniso-tropic | 30 | 0.29 | o | o | o |
| Comp. Ex. 6 | 70/30 | 40 | 20 | aniso-tropic | 40 | 0.43 | x | x | o |
| Comp. Ex. 7 | 70/30 | 92 | 5 | aniso-tropic | 3 | 0.41 | x | o | Δ |
| Comp. Ex. 8 | 70/30 | 87 | 3 | aniso-tropic | 10 | 0.28 | Δ | o | x |
| Comp. Ex. 9 | 70/30 | 70 | 20 | aniso-tropic | 10 | 0.60 | x | x | o |
| Comp. Ex. 10 | 70/30 | 75 | 10 | glo-bular | 15 | 0.69 | x | x | o |

Effects of the Invention

The tape guides according to the present invention are intended for use in a tape cassette including a two-half cassette housing one half of which holding a pair of tape reels and a length of magnetic tape wound on the reels, said housing half having openings formed on the front side for supply and takeup of the tape. The tape guides in a pair are located at both corners of the front side and adjacent the openings to guide the magnetic tape. They are basically made of a composite resin material of polyethylene and polypropylene resins and contain a carbon black and an anisotropic inorganic filler. Thus tape guides of highly insulating resin material which do not produce static electricity in durable running performance with limited material loss can be furnished at low cost.

What is claimed is:

1. In a tape cassette including a two-half cassette housing one half of which holds a pair of tape reels and a length of magnetic tape wound on the reels, said housing half having openings formed on the front side for supply and takeup of the tape, a pair of tape guides located at both corners of the front side and adjacent the openings and wherein the guides consist essentially of a composite resin material of polyethylene and polypropylene resins and contain a carbon black and an anisotropic inorganic filler.

2. The tape guides according to claim 1 wherein the polypropylene resin has a melt flow rate of from 5 to 30 g/10 min as measured at 230° C. under a load of 2.16 kg and the polyethylene resin has a specific gravity of from 0.954 to 0.970 and a melt flow rate of from 4 to 25 g/10 min as measured at 190° C. under a load of 2.16 kg.

3. The tape guides according to claim 1 or 2 which comprise from 60 to 90 percent by weight of a composite resin material of polyethylene and polypropylene resins, from 5 to 15 percent by weight of a carbon black, and from 5 to 35 percent by weight of an anisotropic inorganic filler.

4. The tape guides according to claim 1 or 2 wherein the proportion of the polyethylene resin to the polypropylene resin in the composite resin material is from 60 to 90 percent by weight to from 40 to 10 percent by weight.

* * * * *

UNITED STATES PATENT AND TRADEMARK OFFICE
CERTIFICATE OF CORRECTION

PATENT NO. : 5,868,336

DATED : February 9, 1999

INVENTOR(S) : Hiroshi Kaneda, Masatoshi Okamura, Hiroshi Yasuda, Yukihiro Tsuchiya It is certified that error appears in the above-identified patent and that said Letters Patent is hereby corrected as shown below:

Title Page, [73] Assignee: After TDK Corporation, Tokyo, Japan,
    insert "Calp Corporation, Tokyo, Japan"

Signed and Sealed this

Fifth Day of October, 1999

Attest:

Q. TODD DICKINSON

*Attesting Officer*    *Acting Commissioner of Patents and Trademarks*